E. A. GOLLE.
CORN PLANTER.
APPLICATION FILED APR. 29, 1920.

1,398,428.

Patented Nov. 29, 1921.
2 SHEETS—SHEET 1.

INVENTOR
E. A. Golle
BY Munn & Co.
ATTORNEYS

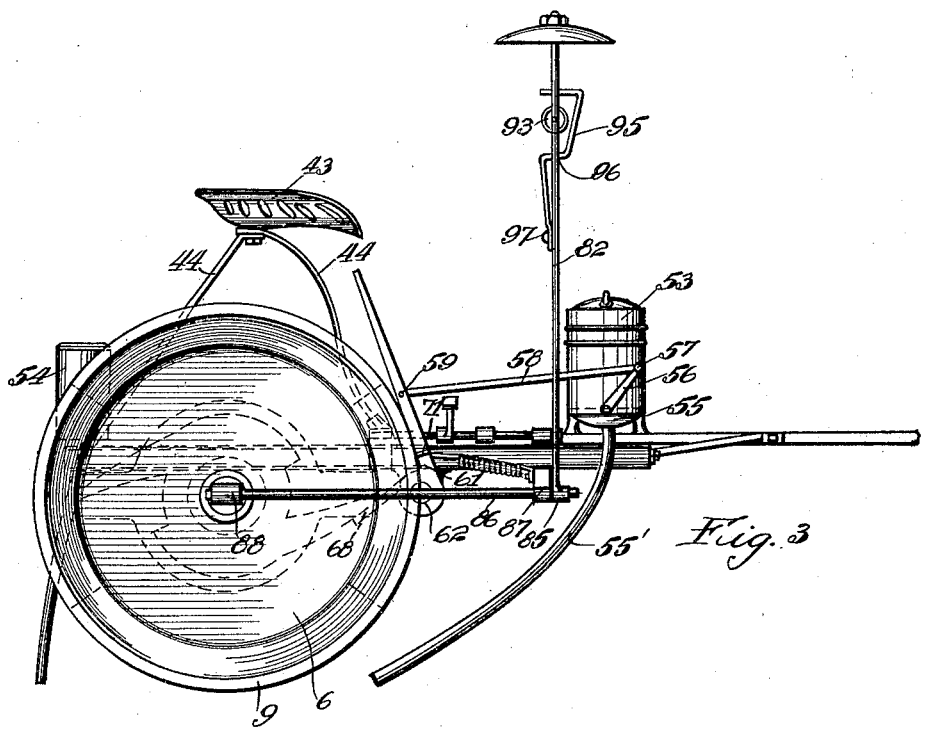
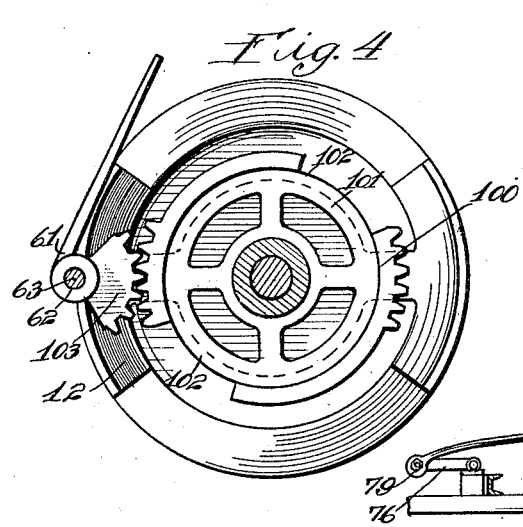
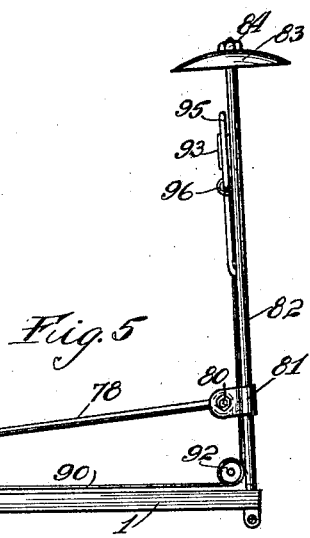

UNITED STATES PATENT OFFICE.

EDWIN A. GOLLE, OF GRAND BEACH, MICHIGAN.

CORN-PLANTER.

1,398,428.  Specification of Letters Patent.  Patented Nov. 29, 1921.

Application filed April 29, 1920. Serial No. 377,595.

*To all whom it may concern:*

Be it known that I, EDWIN A. GOLLE, a citizen of the United States, and a resident of Grand Beach, in the county of Berrien and State of Michigan, have invented a new and useful Improvement in Corn-Planters, of which the following is a full, clear, and exact description.

My invention relates to improvements in corn planters, and it consists in the combinations, constructions, and arrangements herein described and claimed.

An object of my invention is to provide a corn planter in which the means for controlling the dropping of the seed can be operatively connected at will with a traction operated member of the device, thereby causing seed to be dropped when the device is drawn forwardly.

A further object of my invention is to provide a device of the type described in which the means provided for controlling the dropping of the seed can be instantly moved into and out of operative engagement with a traction operated member of the device.

A further object of my invention is to provide in a device of the type described a novel means for covering the seed which has been dropped.

A further object of my invention is to provide in a device of the type described a novel means for marking the seed rows.

A further object of my invention is to provide a device of the type described in which a novel means is provided for establishing the location of a check row.

A further object of my invention is to provide a device of the type described that is strong and durable in construction, simple in operation, and thoroughly practical commercially.

Other objects and advantages will appear in the following specification, and the novel features of the invention will be particularly pointed out in the appended claims.

My invention is illustrated in the accompanying drawings, forming part of this application, in which—

Fig. 3 is a side view of the device,

Fig. 4 is a detailed view of a portion of a modified form of the device,

Fig. 5 is a section along the line 5—5 of Fig. 3,

Figure 1:
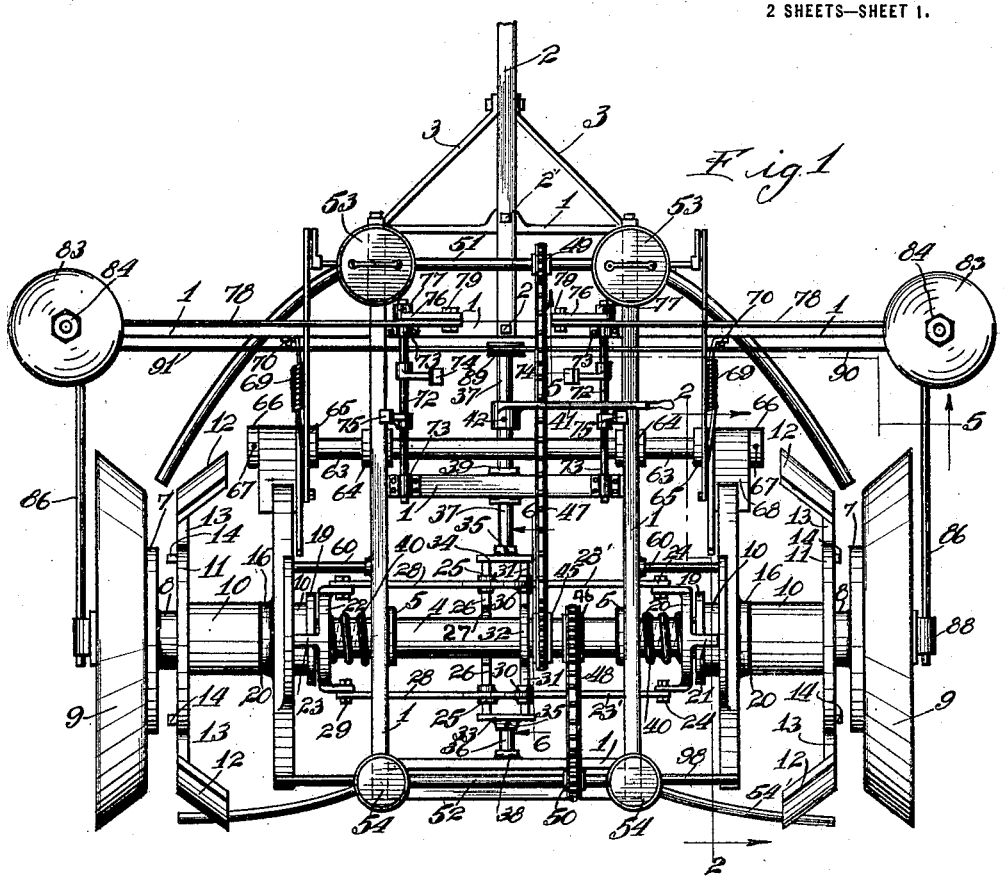
Figure 1 is a plan view of the device, the seat having been removed.
Figure 2:
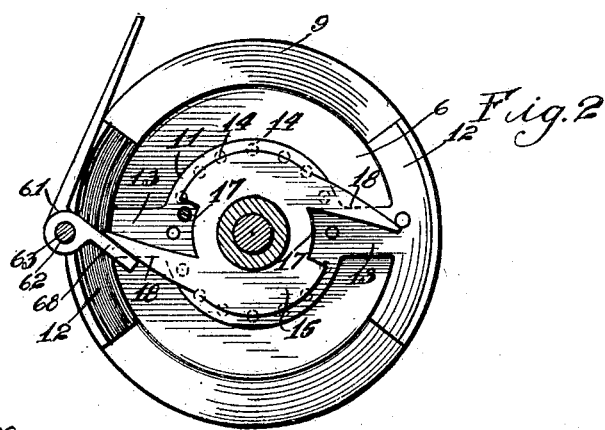
Fig. 2 is a section along the line 2—2 of Fig. 1.
Figure 6:
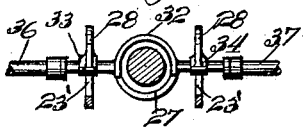
Fig. 6 is a section along the line 6—6 of Fig. 1.

It is well known that the corn planters in common use have been found unsatisfactory in that the means for controlling the dropping of the seed is operated by means of a wire which is stretched across the field, its ends being fastened to stakes. Knots are provided at spaced distances along the line and such knots engage portions of the mechanism provided in the ordinary corn planter to permit the dropping of the seed. In actual service it has been found that the wire wears out quickly, rusts, and does not properly perform its functions in that the wire becomes twisted or the knots do not engage the seed dropping mechanism as intended. Furthermore, it is necessary to wind the wire upon a reel after each operation and the cost of replacing worn out or defective wire is considerable. When the planter has reached one end of the field, the stake at that end is transferred to the next row and when the corn planter is drawn across the field, the wire must be drawn over from the contiguous row before the seed dropping mechanism can be properly operated. It will be obvious that it is impossible to properly plant the seed in the corners of the field when the old form of the device is used.

When my improved corn planter is used, no wire is required, the location of the check row is definitely established, and the seed may be planted in the corners of the field without difficulty.

In carrying out my invention, I provide a suitable frame 1 which may be made of any desired material, preferably metal. A tongue 2 is secured to the frame 1 at 2' and is connected thereto by means of suitable bracing members 3. An axle 4 is journaled in the sides of the frame 1, collars 5 being provided to prevent longitudinal movement of the former. The hubs 8 of a pair of disk wheels 6, which are formed with a laterally extending nave 7 and a beveled rim 9, are mounted upon the ends of the axle 4, one of said wheels being rigidly secured to the axle by any suitable means (none being shown) while the other wheel may turn freely upon the axle 4.

A sleeve 10 is loosely mounted upon the axle 4 adjacent each of the wheels 6. A disk 11, formed with radially extending portions 13 and diametrically opposed segmental rim portions 12, is rigidly secured to the outer end of each of the sleeves 10 to rotate therewith. A plurality of pins 14 project laterally from the outer face of each of the disks 11. When the disk 11 is moved longitudinally along the axle 4, the pins 14 enter the recesses (not shown) which are provided in the adjacent surface of the nave 7, thereby occasioning a rotatable movement of the disks 11 when the wheels 6 are turned. An additional disk 15 is mounted upon each of the sleeves 10 adjacent its inner end and is formed with a collar 16 which is received within a recess 20 in each sleeve 10. The disk 15 has recesses 17 cut in its peripheral edge and is formed with diametrically opposed tapered inclined extensions 18. Each of the disks 15 is secured to the sleeve 10 by suitable means, (none being shown) whereby each of the tapered inclined extensions 18 is arranged in substantial alinement with one of the segmental rim portions 12.

Each of the sleeves 10 is formed with a bead 19 at its inner end. A yoke 20 is loosely mounted upon the axle 4 adjacent the inner end of one of the sleeves 10 and is provided with fingers 21 arranged to engage the bead 19. A similar yoke 22 is loosely mounted upon the axle 4 adjacent the inner end of the other one of the sleeves 10 and is provided with fingers 23 which are arranged to engage the bead 19 of the second sleeve 10. The yoke 20 is connected to a transverse link 26 by means of rigid links 23' which are pivoted at 24 to the yoke 20 and which have their inner ends formed into collars 25, through which the ends of the transverse link 26 are inserted. The latter is curved at 27 to conform to the contour of the axle 4. Likewise, the yoke 22 is secured to a second transverse link 31 by means of rigid links 28 which have their outer ends pivotally connected at 29 to the yoke 22 and which have their inner ends formed into collars 30 through which the ends of the link 31 are inserted. The latter is bent intermediate its length to form the curved portion 32. The ends of the transverse links 26 and 31 are rigidly secured at diametrically opposite points in plates 33 and 34. The plate 33 is carried at the end of a stub shaft 36 and is rigidly secured thereto in any suitable manner, as by a screw 35. The outer end of the stub shaft 36 is journaled at 38 in the frame 1.

The plate 34 is secured at the end of the stub shaft 37 by means of a screw 35. The stub shaft 37 is journaled in the frame 1 at 39. It will be observed that the stub shafts 36 and 37 are co-axially alined. Springs 40 are disposed upon the exle 4 between the yoke 20 and one of the collars 5 and between the yoke 22 and the other of the collars 5. These springs exert a pressure longitudinally to move the sleeves 10 toward the wheels 6. A hand lever 41 is rigidly secured to the stub shaft 37 at 42 and may be operated to move the sleeves 10 longitudinally along the axle 4 into and out of engagement with the wheel 6. The lever 41 is placed in position to be operated by a person seated in a seat 43 which is elevated from the frame by means of supports 44 (see Fig. 3). Pins 60 are secured to the frame 1 and extend laterally in opposite directions. Consequently the sleeves 10 can be moved into the position illustrated in Fig. 1 of the accompanying drawings only when the disks 15 have been rotatably moved into the position illustrated in the same figure. At that time the pins 60 will be received within the recesses 17 and will not prevent the longitudinal movement of the sleeves 10 toward each other.

Sprockets 45 and 46 are rigidly secured to the axle 4. A chain 47 is arranged to engage the sprocket 45 and a sprocket 49, which is rigidly secured on a countershaft 51. A chain 48 is arranged to engage the sprocket 46 and a sprocket 50, which is rigidly mounted on a second countershaft 52. The ends of the coutnershaft 51 are operatively connected to a plate (not shown) which is arranged within a seed box 53, whereby rotation of the axle operates the plate within the seed box, thus permitting seed to be deposited within the lower portion 55 of the seed box 53. Any suitable means for accomplishing this result may be employed as the provision of a particular means is not essential to my invention. In a like manner the countershaft 52 has its end operatively connected with means (not shown) for depositing fertilizer within the lower portion of each of the fertilizer containers 54. The seed box 53 and fertilizer containers 54 are mounted upon the frame 1 in any suitable manner. A tube 55' communicates with the lower portion 55 of each of the seed boxes 53 and has its free end disposed immediately in front of the disk 11 when the latter is in engagement in the nave 7 of the wheel 6. A similar tube 54' leads from the lower end of each of the fertilizer containers 54 to the rear of the position occupied by the disk 11 when the latter engages the nave 7.

Referring now to Fig. 3 of the accompanying drawings, it will be noted that I provide an arm 56 which is operatively connected to a suitable device (none being shown) for controlling the dropping of the seed from the lower portion 55 of the seed box 53 through the tube 55' to the ground. The upper end of the arm 56 is pivotally connected at 57 to a rod 58. The latter is pivotally connected at 59 to a lever 61. The lever 61 is formed with an opening 62 which is adapted to receive the end of a shaft 63. The shaft 63 is supported by brackets 64 which are fastened to a frame 1. The lever 61 is maintained upon each end of the shaft 63 by means of collars 65 and 66. The collar 66 is removable and is secured in position by means of a set screw 67. The lever 61 is formed with a paddle-like portion 68, which extends at an angle to the upper end of the lever 61 and is held in position to be successively engaged by the inclined tapered extensions 18, thereby intermittently operating the rod 58 and the arm 56 to insure the dropping of seed at spaced distances. A spring 69 has one end secured at 70 to a portion of the frame 1 and has its other end connected at 71 with the upper end of the lever 61, thereby tending to move the lever 61 into the position pictured in Fig. 3 of the accompanying drawings.

Since no wire is required in the operation of my improved corn planter, I provide a novel means for establishing the location of the check row. A pair of shafts 72 are journaled in the brackets 73, as best seen in Fig. 1. Pedals 74 and 75 are rigidly secured to the shafts 72 in the relative positions shown in Fig. 1. I provide a pair of arms 76, each of which has one end formed into a collar 77. Each collar 77 is disposed upon an end of one of the shafts 72 and is rigidly secured thereto. The other end of each of the arms 76 is pivotally secured at 79 to a rod 78. The latter has its outer end pivotally secured at 80 to a clamping member 81 which engages a second rod 82. A marking disk 83 is carried at the outer end of each of the rods 82 and is secured thereon by means of a nut 84. The lower end of each of the rods 82 is formed into a collar 85 adapted to receive a rod 86 which is supported at one end by a bracket 87. The latter is secured to a portion of the frame 1. The other end of each of the rods 86 is secured in a bracket 88, which has a portion loosely mounted upon an end of the axle 4, being prevented from displacement therefrom by any suitable means (none being shown).

From the foregoing description of the various parts of the device, the operation thereof may be readily understood. The device is drawn by draft animals in the usual manner. The driver operates the hand lever 41 to move each of the disks 11 into engagement with the naves 7 of the wheels 6. The rotation of the wheels 6 will then rotate the sleeves 10. Consequently the tapered extensions 18 will engage the paddle-like portions 68 of the levers 61, permitting seed to be dropped at spaced distance in front of the disk 11. The segmental rim portions 12 will cover the seed thus dropped and will mark the location of the planted seed. The tapered inclined extensions 18 will also engage arms 98, which are operatively connected with suitable plates (not shown) in the lower portions of the fertilizer containers 54, thereby permitting fertilizer or the like to be deposited through the tubes 54'. If it is so desired, a substance such as lime may be placed in the fertilizer containers and deposited in the manner described, thus more permanently marking the location of the planted seed. During the time the corn planter is being drawn across the field, one of the marking disks 83 has been lowered into position by means of the operation of one of the pedals, thereby establishing the location of a check row. The establishing of a check row in this manner enables the driver to plant the seed in rows which are substantially the same distance apart. It is sometimes desirable in planting corn or the like to mark the beginning of a row by a stake. I therefore provide means for moving the disks 11 into engagement with the naves 6, whereby planting of the seed is commenced when the stake is encountered by a portion of the device. To this end I mount a pulley 89 upon the end of the stub shaft 37. Cables 90 and 91 have their adjacent ends secured to the rim of the pulley 89 in an ordinary manner at diametrically opposite points. The cables 90 and 91 are each conducted through guiding pulleys 92 and 93 and each has its outer end connected to the end of a spring member 95, as best seen in Figs. 3 and 5 of the accompanying drawings. The spring 95 is formed in the shape shown in the drawings and is passed intermediate its length through a staple 96, which is driven into the rod 82. The inner end of the spring member 95 is secured at 97 to the rod 82. The spring member 95 will be moved into contact with the stake, which is driven into the ground for establishing the location of the beginning of a seed row. The pulley 89 will be rotated by the pressure of the stake against the spring member 95, thereby permitting the disks 11 to be moved into engagement with the naves 7 by the tension exerted by the springs 40.

Referring now particularly to Fig. 4 of the accompanying drawings, I show a portion of a modified form of the device. I have indicated corresponding parts of the preferred form of the device and modified form of the device, and shall confine my description of the modified form of the device to portions which differ from corresponding portions in the preferred form of the device. Instead of the disk 15, as found in the preferred form of the device, I provide a disk 101 which is formed with radially extending segmental gear portions 100 and which is provided with recesses 102, which are cut into its peripheral edge. The segmental gear portions 100 engage a segmental gear portion 103 which is formed integrally with each of the levers 61. The gear portion 103 therefore performs the function of one of the paddle-like extensions 68, which are provided in the preferred form of the device.

It is obvious that many forms and adaptations of the device pictured in the accompanying drawings may be provided without departing from the spirit and scope of my invention as set forth in the foregoing specification and outlined more particularly in the appended claims. I therefore consider such forms and adaptations as my own.

The stakes mentioned hereinbefore as marking the begining of the row to be planted may be chained to the rods 82 and carried along with the corn planter after contacting with the springs 40 in the manner described. It will also be noted that the shaft 52 will be provided with a suitable clutching device (none being shown in the drawings) since lime or the like, which is contained within the containers 54, is deposited only as desired.

I claim:

1. In a device of the character described, the combination with the axle, of a ground wheel mounted thereon and formed with a nave having a plurality of recesses in its inner face, said recesses being arranged in a circle concentric with the bore of the nave, a sleeve rotatably and slidably disposed on the axle adjacent to the inner face of the nave, and a disk rigidly mounted on the sleeve at its outer end and formed with radially extending laterally inclined segmental rim portions, said disk having a diameter substantially equal to that of the ground wheel and being provided with a plurality of pins projecting laterally of the outer face of the disk in position to enter said recesses when the disk is moved contiguous to the wheel.

2. In a device of the character described, the combination with the axle, of a ground wheel mounted thereon, a sleeve rotatably and slidably disposed on the axle adjacent to the inner side of the wheel and a disk rigidly mounted on the sleeve at its outer end and formed with a purality of spaced apart radially extending laterally inclined marking and covering segmental rim portions, said disk having a diameter substantially equal to that of the ground wheel, and said ground wheel and said disk being coöperatively formed for occasioning the engagement of said disk with the wheel when the former is moved contiguous to the latter.

EDWIN A. GOLLE.